United States Patent [19]

Verlin

[11] 4,165,638
[45] Aug. 28, 1979

[54] ENTANGLEMENT TESTING APPARATUS AND METHOD

[75] Inventor: Jerome R. Verlin, Elkins Park, Pa.

[73] Assignee: Techniservice Division Textured Yarn Co., Inc., Kennett Square, Pa.

[21] Appl. No.: 850,424

[22] Filed: Nov. 10, 1977

[51] Int. Cl.² .......................................... G01L 5/04
[52] U.S. Cl. ............................................... 73/160
[58] Field of Search ................................. 73/159–160; 57/34 R, 156; 28/247

[56] References Cited

U.S. PATENT DOCUMENTS

| | | | |
|---|---|---|---|
| 3,290,932 | 12/1966 | Hitt | 73/160 |
| 3,363,459 | 1/1968 | Brown | 73/160 |
| 3,401,559 | 9/1968 | Rice | 73/160 |
| 3,566,683 | 3/1971 | Bulla et al. | 73/160 |
| 3,793,883 | 2/1974 | Goldfarb et al. | 73/160 |

Primary Examiner—Charles Gorenstein
Attorney, Agent, or Firm—Miller & Prestia

[57] ABSTRACT

An entanglement tester, for testing the degree of entanglement of the yarns such as jet-entangled, yarn, is provided. A complex yarn path is provided, having sections arranged at angles to each other, and a measuring device is provided which may be displaced by shortening the yarn path. Means are provided for inserting a pin or needle into and through the yarn, guiding the yarn onto and off of the pin by using pivoting or sliding guides that are worked by yarn tension, and the yarn is displaced in a manner to shorten the yarn path, thus displacing the measuring device until a point of entanglement is reached. The distance between point of insertion and point of entanglement may be read out, and the measuring process repeated many times without painstaking hand guiding operations.

25 Claims, 1 Drawing Figure

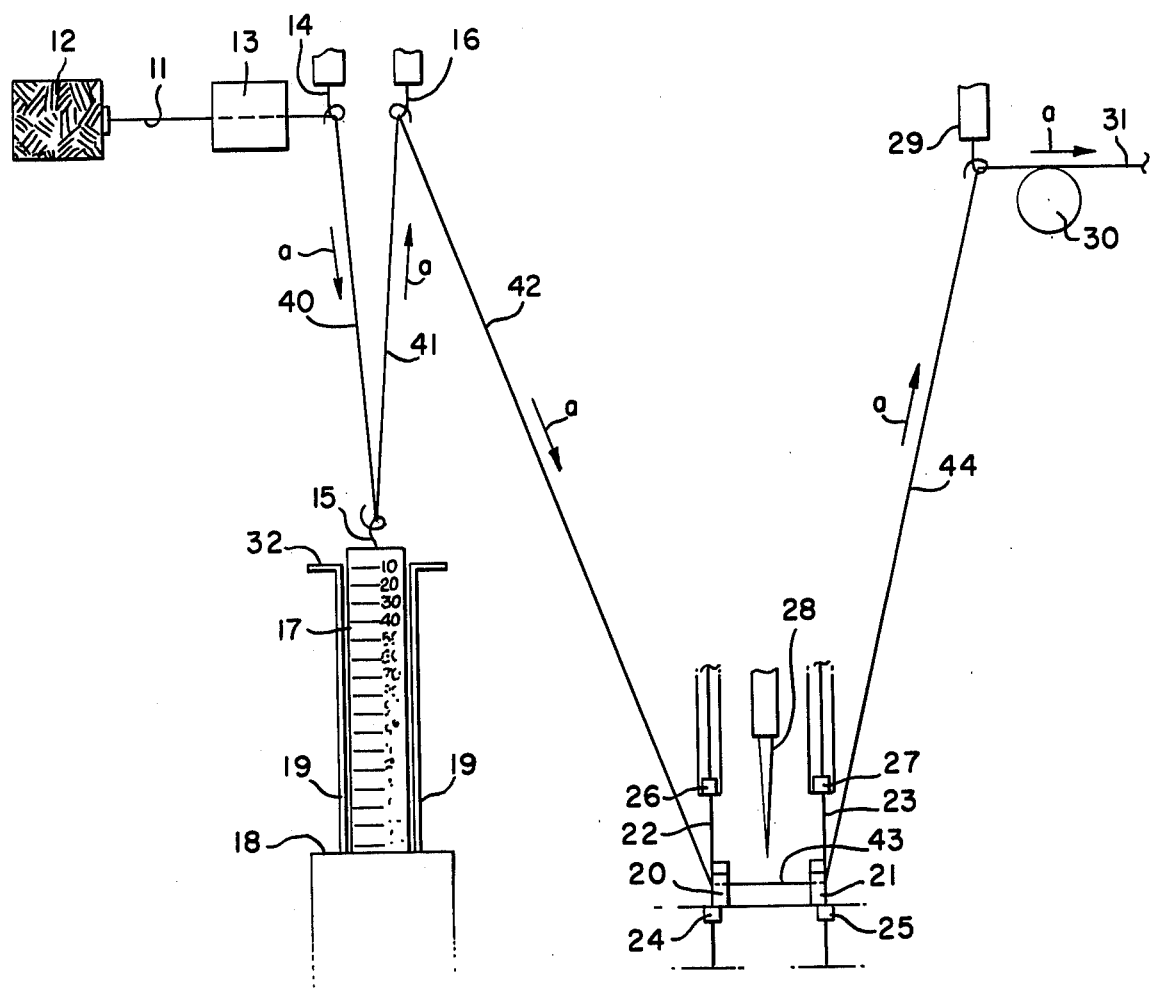

ENTANGLEMENT TESTING APPARATUS AND METHOD

BRIEF DESCRIPTION OF THE INVENTION

This invention relates to an entanglement tester, and more particularly relates to a tester which may be readily manipulated in order to measure the distance between point of insertion of a needle into the yarn and the site of entanglement, repeatedly with great ease and accuracy. The invention also relates to an entanglement tester of this type which not only reads out the number of sites of entanglement per unit length of the yarn, but also provides information as to individual distances between point of insertion and point of entanglement and can even afford the opportunity for counting the number of sites of entanglement per unit length. Other features and advantages of this invention will further become apparent hereinafter.

PRIOR ART

Bunting & Nelson U.S. Pat. No. 2,985,995 discloses a manual test (the "hook drop" test) for determining the frequency of entanglement sites in entangled multifilament yarn. Since the effectiveness of entanglement as a twist substitute depends largely upon the frequency of occurrence of entanglement sites, and since entanglement is random in nature, the hook drop test must be performed a large number of times to yield significant statistical values such as mean distance between sites ($\bar{x}$), standard deviation ($\sigma'$), standard error of mean ($\sigma'_{\bar{x}}$) and coefficient of variation ($\sigma'/\bar{x}$) validly representative of a sample of a particular yarn. For this reason, various devices have been developed and patented, and at least one offered commercially, for performing the hook-drop or other entanglement test better and faster than manually.

Several prior art devices have been developed for entanglement testing by inserting a pin through moving yarn. These are essentially of two types: those which measure the distance between entanglement sites (yielding $\bar{x}$, $\sigma$ and CV), and those measuring the number of entanglement sites per unit length of tested yarn.

The hook-drop test itself is of the former type. This is evident from the description contained in the aforementioned U.S. Pat. No. 2,985,995, and also from summaries of the manual hook-drop procedure as reported in the patents to Hitt U.S. Pat. No. 3,290,932 (col. 1, lines 22–33) and Rice U.S. Pat. No. 3,401,559, (col. 1, lines 60–72), for example.

The Hitt device of U.S. Pat. No. 3,290,932, modified in the U.S. patent to Gray U.S. Pat. No. 3,563,021 (Fig. 8, col. 7, lines 22–70 and col. 15, line 70 to col. 16, line 45), automates the procedure used in the apparatus called the "automatic pin drop counter" ("APDC"). A pin on a pivoted mount is pneumatically fired into the travelling yarn and a counter begins measuring the distance of yarn travel through the pin. Slight deflections of the pin are ignored. When, however, an interlace site causes the pin to pivot beyond a pre-selected limit, measuring is stopped and the pin is retracted. The distance measured between insertion and retraction of the pin is recorded, and the cycle is repeated as many times as desired. Hitt requires a probe movable with the yarn, and means responsive to probe movement a predetermined distance for determining how far the yarn advances before the probe so moves.

A commercial tester known as the Rothschild Automatic Yarn Entanglement Tester Model NPT R-2040 (see also Bulla U.S. Pat. No. 3,566,683) also operates on the distance-between-entanglement-sites principle. A pin is inserted into the yarn and the distance of yarn travel from point of insertion to filament entanglement site is measured and printed. Instead of using a weighted pivoted pin as does Hitt, Rothschild uses an electronic tensometer to measure tension against the pin which (but for tension sensing) remains stationary. At the end of the test series, the total of the individual test distances is printed, making it thus possible to determine the average length value ($\bar{x}$). This apparatus is complicated and expensive and would appear to require separate processing of the tape to determine the values pf $\sigma$ and CV.

Another Rothschild Entanglement Tester, identified as R-2050, is of the number-of-sites-per-unit-yarn-length variety. It costs less than Model R-2040 and has a pin which trips when the pre-selected tension is reached, as in the case of the R-2040, but all that is recorded is the number of trips (sites) per pre-set length.

Rice U.S. Pat. No. 3,401,559, and Goldfarb U.S. Pat. No. 3,793,883 also use the number-of-entanglement-sites-per-unit-yarn-length principle, and are accordingly so directed.

British Pat. No. 1,422,615 discloses a "pin-wheel" device for entanglement testing, wherein yarn is pulled tangentially over a wheel in engagement with one of several pins extending radially outwardly from its periphery. The yarn pushes the engaged pin out of its way when an entanglement site is reached, thereby rotating the wheel and causing the next pin to engage upstream. The extent of wheel rotation per unit yarn advancement is measured. Thus, this device operates on the same sites-per-length principle.

Bulla U.S. Pat. No. 3,566,683, supra, states that the major defects of the hook-drop test are that it is slow and tedious, and prone to inaccurate manual hook insertion by the operator, and that the operator can inadvertently damage the yarn (invalidating the test, which is, however, destructive of the yarn in any case) during the manual pin insertion.

Bulla then goes on to discuss another manual method:

". . . known as the 'needle pull' method. The yarn is pierced by a stationary needle so that at least one-third of the filaments are on one side of the needle. The yarn is then pulled lengthwise by hand along a meter stick until an entanglement point is sensed against the needle. The distance over which the yarn is pulled is analagous to the travel on the hook in the 'hook-drop' test. The 'needle pull' test procedure is considerably faster than the 'hook-drop' test, but it neither reduces operator fatigue, nor eliminates the manual handling of the yarn." (col. 2, lines 15–25).

OBJECTS OF THE INVENTION

It is accordingly an object of this invention to provide a simple, efficient and economical tester which overcomes the disadvantages existing in the prior art.

Still another object of this invention is to provide a yarn entanglement tester which can be conveniently operated to repeat the yarn entanglement test procedure a large number of times with minimum labor, effort and expenditure of time.

Other objects and advantages of this invention, including the ease with which it may be applied to the reporting of a wide variety of different parameters, and the ease with which it may be applied to the measurement with respect to widely varying yarns, and yarns of widely varying deniers, will further become apparent hereinafter and in the drawing in which:

DRAWING

The drawing is a schematic illustration in side elevation, showing one form of apparatus embodying features of this invention.

In the detailed description which follows, it will be appreciated that the apparatus may be varied in many respects, and that one specific form of the apparatus has been selected for illustration in the drawing herein. In the interest of clarity and brevity, specific terms will be used in the description which follows, which terms are intended to apply directly to the embodiment of the invention selected for illustration. The use of such specific terms is not intended to define or limit the scope of the invention, which is defined in the appended claims.

DETAILED DESCRIPTION OF THE INVENTION

In accordance with this invention, an apparatus and method has been created for performing a series of repetitions of an entanglement test very similar to the hook-drop test, but for performing the test much more rapidly than the hook-drop test could be performed manually, as instructed by Bunting & Nelson. The device is much less elaborate than those of Hitt (U.S. Pat. No. 3,290,932) and Rothschild, but is much less expensive. It may be less fully automated if desired. It yields test results for bulked entangled carpet yarns consistent with reasonable expectation in controlled experiments (e.g., making several sample tubes holding all variables constant except air pressure), and on successive testings of the same tubes. It may be made to provide greater measurement accuracy and to extend applicability of the device to very fine deniers.

The tester in accordance with this invention uses the length-between-sites, rather than the number-of-sites-per-unit-length, principle. The former is preferable, not only because it permits calculation of more detailed information (e.g., site distance variation as expressed by $\sigma$ and CV) over a shorter yarn length than the latter principle, but also because it is the principle employed by the manual hook-drop method, to users of which the marketing of the device would be directed.

The tester of this invention, in the embodiment selected for illustration in the drawings, semi-automates the "needle pull" test, as described by Bulla. Pin insertion, perhaps the most tedious and time-consuming manual task, and the one most prone to test-affecting inaccuracy or yarn damage, is preformed by the device. The device also measures the yarn travel distance, freeing the operator from having to control closely and measure the distance of movement of the operator's hand. The operator's roles are reduced to yarn advancement and recording results displayed by the machine. The device may be fully automated, as well.

Referring now to the drawing, the parts shown therein are mounted on supporting devices such as a typical textile machine frame, for example, the details of which are not shown in the drawing since they may be of an entirely conventional nature, and since important features of this invention would be obscured by fully illustrating such irrelevant items such as machine frame members, etc.

As shown diagrammatically in the drawing, yarn 11 is withdrawn from package 12 and passes through advancement lock 13, (which may be any convenient form of yarn clamp or brake which can be opened and closed to permit and to prevent yarn movement) and then through pigtail guides 14, 15 and 16. Guides 14 and 16 are stationary (fixedly mounted to the apparatus frame), whereas guide 15 is mounted on measuring weight 17 resting on base 18 within guideway 19. The yarn then proceeds through a pair of guides 20, 21 slidably mounted for movement up and down on tracks 22, 23 between slide stops 24, 25, 26, 27. The weights of slidable guides 20, 21 are less than that of weight 17, for reasons which will appear in further detail hereinafter.

Fixedly mounted, and accurately positioned with respect to the yarn path between guides 20, 21 is a stationary pin 28 with its point at a height intermediate the lower slide stops 24, 25 and the upper slide stops 26, 27. The yarn finally proceeds through stationary guide 29 and around drive roll 30, from which it is directed to a waste receptacle, not shown in the interest of clarity.

Accordingly, this apparatus provides a complex yarn path including angularly arranged legs designated by the numbers 40, 41, 42, 43 and 44.

To operate the device, the operator first grasps the yarn at point 31 (conveniently with the right hand) and pulls to the right. At this stage, advancement lock 13 is left open, and there is thus no impediment to the operator's freely drawing yarn off the pirn 12 and pulling it entirely through the complex yarn path in the (downstream) direction indicated by the arrows (a).

When a selected length of yarn (which may be approximately determined) has been thus advanced through the device, the operator closes advancement lock 13 by pinching it closed (conveniently with the left hand), which prevents any further yarn from passing through lock 13 regardless of the pull force exerted from the downstream direction. Any further advancement of yarn past point 31 can thus be accomplished only by shortening the complex yarn path 40, 41, 42, 43, 44 between points 14 and 29.

The operator continues (or resumes) to pull the yarn to the right at point 31, while maintaining lock 13 closed. The first effect is to remove any slack from the yarn path. The second effect is to commence shortening of the yarn path 40-44. The weight of slide guides 20, 21 is less than that of measuring weight 17, so guides 20, 21 move upwards from their rest stops 24, 25 to upper slide stops 26, 27, and in so doing insert the yarn on pin 28. Any further movement of the yarn downstream will thus be through the pin. As the operator continues to pull to the right from point 31, only measuring weight 17 remains in movable position, and it begins to move upwardly toward guides 14 and 16. The distance of upward travel of weight 17 is directly proportionally related to the length of yarn travel through pin 28. If guides 14, 16 are very close to each other, displacement of weight 17 is substantially one-half the distance between point of pin insertion and point of entanglement. When an entanglement site is encountered at pin 28, the operator will be unable to advance the yarn further at point 31. Actually, a slight stretching of the yarn, especially if it is textured yarn, is still possible between pin 28 and point 31, which would allow a slight additional advancement of the yarn past point 31; however, the stretching force is not transmitted upstream of the entanglement site lodged on pin 28, and thus does not cause any further upward movement of measuring weight 17. This is an important and advantageous feature of this invention and is a further advantage over the manual "needle pull" test, as described by Bulla.

The operator then reads the scale on measuring weight 17 at reference point 32, (or it is electronically or otherwise recorded and/or displayed), which shows in the scale's length units the upward distance travelled by measuring weight 17, and thus the length travelled by the yarn, subsequent to the insertion of the yarn by slide guides 20, 21 onto pin 28.

Holding the yarn stationary at roll 30, after slight advancement, the operator then releases yarn advancement lock 13. Gravity pull on weight 17 and slide guides 20 and 21 draws yarn from pirn 12 and drops weight 17 and guides 20, 21 to their original rest positions. The operator then repeats the test sequence many times (for example, 100 times), using successive lengths of yarn, commencing each time just upstream of the previous entanglement site.

The information provided according to this invention from a series of test readings for a particular yarn includes average distance between sites ($\bar{x}$); uniformity of site spacings, absolutely ($\sigma$), and as a percentage of the site distance means (CV), and the reliability of an average determined for a particular yarn of a particular sample size ($\bar{x} \pm 3\ \sigma'\bar{x}$). In order to maintain continuity of records of purchasers of the device who formerly used some other procedure such as the manual hook-drop method, a special test scale may be developed and applied to weight 17, to give values which when entered into "coherency factor" calculations of the manual test will yield comparable values.

A host of variations of the device in the drawing can be envisioned. A stop mechanism may be employed in weight 17 to prevent it from pulling all the way out of guide 19. Slide guides 20, 21 may be replaced by pivot arms, and more accurate positioning and, perhaps, flattening guides may be used. The scale readings of weight 17 may be sensed eelectronically by a computer device programmed automatically to report values of $\bar{x}$, $\sigma'$, $\sigma/\bar{x}$, and $\bar{x} \pm 3\ \sigma'$, and perhaps other figures. Roll 30 may be replaced with a drag driving mechanism analagous to that of a bait-casting fishing reel ("star" drag) which has a presettable friction drag and which serves to eliminate any inaccuracies caused by uneven pulling. The whole device can be automated. A multi-end device can be made, so that several yarns can be tested simultaneously in a generally warpwise arrangement by using either individual star drags or additional heavy weights downstream of pin 28 to compensate for different shortening lengths for each end.

Although the apparatus as described utilizes gravity and weights to control the shortening of the yarn path, springs or cylinders or other force-applying means could be substituted and the entire apparatus could be mounted horizontally or at an angle to the vertical, if desired.

It will also be appreciated that the means for causing the yarn to be penetrated by the pin, in accordance with this invention, is capable of use independently of the yarn entangling measurement portion of the apparatus. In this connection, this invention provides an apparatus for inserting the pin to and through the yarn, by providing a guide means arranging the yarn in a shortenable path, and means mounting the pin in position for engaging and penetrating the yarn when the path is shortened. Such an apparatus and method can readily be utilized in conjunction with yarn entanglement measurements, regardless whether the measurement is actually conducted in the manner described and claimed herein.

Similarly, the novel means for measuring degree of entanglement as disclosed herein may be utilized independently of the manner in which the pin is caused to engage and to penetrate the yarn. Applicant has accordingly provided a measurement apparatus including a guide means upstream of the pin and arranging the yarn as a shortenable leg, combined with means for holding the yarn stationary upstream of the leg, and means for measuring displacement of the shortenable leg in response to movement of the yarn passed the pin.

Further, although reference has been made repeatedly in the specification to the provision of a leg which can be shortened, either for pin engagement and penetration or for measurement of yarn movement passed the pin, it will be appreciated that other forms of leg displacement may be utilized instead.

It will further be appreciated that, wholly aside from the specific nature of the apparatus that is utilized, a novel manipulative method has been provided for testing multi-filament yarn for degree of entanglement, which method includes the steps of arranging the yarn as a plurality of legs which are displaceable in response to yarn tension, arranging a yarn testing pin adjacent one of the legs, displacing such leg, causing a portion of the yarn in that leg to be penetrated by the pin, applying further tension to the yarn thereby moving the yarn past the pin until a point of filament entanglement is reached, and concurrently displacing another of the yarn legs in an amount corresponding to the length of yarn moved past the pin and measuring the displacement of the other leg.

It will further be appreciated that a wide variety of other changes may be made, including the substitution of equivalent elements for those specifically shown in the drawing, the substitution of parts, and the utilization of certain features independently of other features, all without departing from the spirit and scope of the invention as defined in the appended claims.

I claim:

1. In an apparatus for testing multifilament yarn for degree of entanglement, the combination which comprises:
   (a) a base,
   (b) a plurality of guides mounted in spaced-apart relationship on said base and forming a yarn guide path in the form of a plurality of yarn legs, one of said legs being a pin-engaging leg and the other being an entanglement measuring leg,
   (c) means in each of said legs causing shortening of said leg in response to application of tension to said yarn,
   (d) a yarn testing pin adjacent said pin-engaging leg, in a position to penetrate said yarn in response to yarn tension shortening said pin engaging leg, and
   (e) measuring means operatively connected to said entanglement measuring leg to measure the shortening displacement of said measuring leg in response to yarn movement past said testing pin.

2. The apparatus defined in claim 1, wherein said means (c) includes movable guides.

3. The apparatus defined in claim 2, wherein restraining means are provided in each of said legs for restricting movement of said movable guides.

4. The apparatus defined in claim 3, wherein the restraining means in the entanglement measuring leg and the restraining means in the pin-engaging leg are operative at different tensions.

5. The apparatus defined in claim 4, wherein the restraining means in the pin-engaging leg is operable to permit movement of the movable guides in said pin-engaging leg at a predetermined yarn tension.

6. The apparatus defined in claim 5, wherein said predetermined tension is lower than the minimum tension required to cause movement of the movable guides in said entanglement measuring leg.

7. The apparatus defined in claim 3, wherein said restraining means comprises weight means, and wherein the weights of said movable guides in said pin-engaging leg and in said entanglement measuring leg are different from each other.

8. The apparatus defined in claim 7, wherein the weights of said movable guides in said entanglement measuring leg are greater than the weights of said movable guides in said pin-engaging leg.

9. The apparatus defined in claim 1, including a yarn supply for making repeated measurements along successive lengths, and a yarn holding means intermediate said supply and said yarn legs for holding said yarn against movement during each entanglement test, and for permitting movement of yarn from said supply for initiating each successive test.

10. Apparatus for repeatedly testing yarn for filament entanglement wherein a yarn supply is provided with a means for selectively stopping yarn movement from said supply during each test but for releasing said yarn from said supply to provide further yarn for each successive test, said apparatus also including a movable gaging member for indicating distances between point of insertion of an entanglement testing pin into said yarn and point of entanglement of filaments in said yarn, said apparatus comprising:
  (a) guide means positioned downstream of said stopping means arranged to provide said yarn in a multiplicity of angularly related paths, said yarn paths including:
    (i) a pair of yarn legs substantially parallel to each other and connected to said movable gaging member, restraining means confining said movable gaging member against movement but permitting such movement in a predetermined direction in response to a predetermined amount of tension of yarn in said legs,
    (ii) another pair of yarn legs connected downstream of said legs (i) each extending through a movable guide, each said movable guide being movable to shorten the yarn path in response to a yarn tension in said legs which tension is less than said predetermined amount of yarn tension required to move said movable gaging member in leg (i),
    (iii) a yarn testing leg extending between said yarn legs (ii), and
  (b) a yarn testing pin mounted in line with said yarn testing leg (iii) and in a position to penetrate said yarn upon attainment of a predetermined yarn tension sufficient to displace said movable guides, whereby tensioning of said yarn at said tension level causes movement of said movable guides and shortening of said yarn legs (ii) to penetrate said pin through said yarn testing leg (iii), whereby application of a higher tension to said yarn than said predetermined yarn tension causes said yarn to move past said pin until an entanglement site is reached, said movement of said yarn shortening the yarn in yarn legs (i) causing a corresponding and measurable movement of said movable gaging member.

11. The apparatus defined in claim 10, wherein said yarn legs extend from a pair of upper stationary guides which are spaced closely to each other, down to said movable gaging member which is a weight suspended by gravity on said yarn from said upper stationary guides.

12. The apparatus defines in Claim 11, wherein a base is provided upon which said weight is supported, and wherein substantially vertical guide means are provided for controlling the path of upward movement of said weight in response to yarn movement past said pin.

13. The apparatus defined in claim 10, wherein said yarn legs (ii) extend from a pair of upper stationary guides down to a pair of weighted movable guides wherein said yarn leg (iii) extends between said weighted movable guides, and wherein said pin is positioned directly above said yarn leg (iii).

14. The apparatus defined in claim 10, wherein a yarn takeup roll is provided, downstream of all of said yarn legs.

15. In an apparatus for testing multifilament yarn for degree of entanglement, wherein a pin is provided for determining occurrence of entanglement sites, means for engaging said pin and said yarn into a position wherein said yarn is penetrated by said pin, and for disengaging said yarn from said pin, said means comprising:
  (a) guide means for arranging said yarn in a shortenable path,
  (b) means mounting said pin in a predetermined position for engaging and penetrating said yarn when said path is shortened, and
  (c) means for maintaining said pin in the same position upon engagement and disengagement with said yarn.

16. In an apparatus for measuring degree of entanglement of multiple filaments in yarn penetrated by a testing pin and drawn in a downstream direction past said pin while penetrated by said pin, the combination which comprises:
  (a) guide means upstream of said pin arranging said yarn as a shortenable leg,
  (b) means for holding said yarn stationary upstream of said leg, and
  (c) means for measuring displacement of said shortenable leg in response to movement of said yarn past said pin.

17. In a method of testing multifilament yarn for degree of entanglement, the steps which comprise:
  (a) arranging said yarn as a plurality of legs which are displaceable in response to yarn tension,
  (b) arranging a yarn testing pin adjacent one of said legs,
  (c) displacing said one leg causing a portion of the yarn in said leg to be penetrated by said pin,
  (d) applying further tension to said yarn thereby moving said yarn past said pin until a point of filament entanglement is reached,
  (e) concurrently with step (d) displacing in an amount corresponding to the length of yarn moved past said pin, another of said yarn legs, and
  (f) measuring the displacement of said other leg.

18. The method defined in claim 17, including the further steps of providing a yarn supply for conducting repeated tests, and of preventing yarn movement at a location upstream of said yarn legs while said yarn is being moved past said pin.

19. In a method of inserting the point of a pin through a multifilament yarn, the steps which comprise forming said yarn into a displaceable path, which path is displaceable in response to yarn tension, supporting said pin in spaced relation to said yarn in said path, and in the same plane as said yarn, and applying tension to said yarn in a manner to displace said yarn toward and beyond the point of said pin.

20. The method defined in claim 19, including the further step of applying further tension to said yarn and thereby pulling said yarn past said pin while said pin extends through said yarn.

21. The method defined in claim 19, including the further step of relaxing said tension and thereby removing said yarn from said pin.

22. The method defined in claim 19, including the further step of displacing said yarn along its length past said pin until a site of entanglement is reached.

23. The method defined in claim 22, including the further step of measuring the distance between the point of the insertion of the pin and the site of enganglement.

24. The method defined in claim 23, wherein a measuring means is provided for said measuring step, including the further step of maintaining said measuring means stationary until after said tension is applied to said yarn and after said yarn is displaced toward and beyond the point of said pin.

25. The method defined in claim 24, including the step of automatically actuating movement of said measuring means in response to said displacement of said yarn along its length.

* * * * *

UNITED STATES PATENT AND TRADEMARK OFFICE
CERTIFICATE OF CORRECTION

PATENT NO. : 4,165,638
DATED : August 28, 1979
INVENTOR(S) : Jerome R. Verlin

It is certified that error appears in the above-identified patent and that said Letters Patent are hereby corrected as shown below:

Column 3, line 52, change "preformed" to --performed--

Column 5, line 38, change "eelectronically" to --electronically--

Column 8, Claim 11, line 5, after "legs" insert --(i)--

Column 8, Claim 12, line 10, change "defines" to --defined--

Signed and Sealed this

Twentieth Day of November 1979

[SEAL]

Attest:

RUTH C. MASON
*Attesting Officer*

LUTRELLE F. PARKER
*Acting Commissioner of Patents and Trademarks*